(12) United States Patent
Bacardit et al.

(10) Patent No.: US 7,201,456 B2
(45) Date of Patent: Apr. 10, 2007

(54) PNEUMATIC BRAKE BOOSTER

(75) Inventors: Juan Simon Bacardit, Barcelone (ES); Bruno Berthomieu, Barcelone (ES); Fernando Sacristan, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 185 days.

(21) Appl. No.: 10/526,262

(22) PCT Filed: Sep. 9, 2003

(86) PCT No.: PCT/EP03/10100

§ 371 (c)(1),
(2), (4) Date: Mar. 2, 2005

(87) PCT Pub. No.: WO2004/026653

PCT Pub. Date: Apr. 1, 2004

(65) Prior Publication Data

US 2006/0022517 A1    Feb. 2, 2006

(30) Foreign Application Priority Data

Sep. 19, 2002   (FR) .................................. 02 11745

(51) Int. Cl.
*B60T 8/34* (2006.01)
(52) U.S. Cl. .................. 303/114.3; 91/369.3; 91/376 R
(58) Field of Classification Search .............. 303/113.3, 303/114.3; 91/376 R, 369.1, 369.2, 369.3, 91/369.4
See application file for complete search history.

(56) References Cited

U.S. PATENT DOCUMENTS

| | | | | |
|---|---|---|---|---|
| 4,729,286 A | * | 3/1988 | Blot ......................... | 91/376 R |
| 4,953,446 A | * | 9/1990 | Fecher et al. .............. | 91/369.3 |
| 5,245,829 A | * | 9/1993 | Osterday et al. .......... | 91/376 R |
| 6,564,692 B2 | * | 5/2003 | Inoue et al. ............... | 91/376 R |
| 6,755,116 B1 | * | 6/2004 | Tsubouchi et al. ........ | 91/376 R |
| 7,014,276 B2 | * | 3/2006 | Miwa et al. ............. | 303/114.3 |
| 7,089,846 B2 | * | 8/2006 | Tsubouchi et al. ........ | 91/376 R |
| 2002/0056362 A1 | * | 5/2002 | Inoue et al. ............... | 91/376 R |

FOREIGN PATENT DOCUMENTS

| | | |
|---|---|---|
| DE | 198 35 772 | 2/2000 |
| DE | 100 54 252 | 5/2002 |
| WO | WO 200132488 A1 * | 5/2001 |

\* cited by examiner

*Primary Examiner*—Thomas Williams
(74) *Attorney, Agent, or Firm*—Leo H. McCormick, Jr.; Sarah Taylor (57) ABSTRACT

A pneumatic brake booster for a motor vehicle, comprising a piston (22) mounted between a control rod (24) actuated by a brake pedal and a push rod (34) actuating a piston of a brake master cylinder. Structure for increasing brake boosting during an emergency braking, comprising a cylindrical sleeve (46) mounted in an axially sliding and sealed manner inside the piston (22). The sleeve being retained in the rest position by locking arrangement (58) and released to push away the shutter (56) of a three-way valve and increase the supply of atmospheric air to the booster when the control rod (24) is moved at a speed that is greater than a predetermined value.

14 Claims, 8 Drawing Sheets

PNEUMATIC BRAKE BOOSTER

The invention relates to a pneumatic brake booster, in particular for a motor vehicle.

BACKGROUND OF THE INVENTION

Boosters of this type comprise, in a known way, a vacuum chamber and a working chamber which are separated from one another by a sealed diaphragm borne by a skirt associated with a piston which is axially displaceable in one direction by a pressure difference between the two chambers and in the other direction by a return spring.

The booster piston is mounted between a control rod actuated by a brake pedal, and a push rod which drives a piston of a brake master cylinder (generally the primary piston of a tandem master cylinder).

At its end on the booster side, the control rod is terminated by a plunger guided in axial translation in a housing of the piston. This housing opens onto a reaction disk made of incompressible material, for example an elastomer or the like, which is interposed between the piston and the push rod.

A three-way valve is mounted in the piston around the control rod and comprises an annular shutter engaging with a sealing seat formed on the piston and with a sealing seat formed on the plunger. This valve is actuated by the movement of the control rod and controls the supply of atmospheric air to the booster.

At rest, in a non-braking condition, the working chamber of the booster is isolated from the external atmosphere by the shutter of the three-way valve and communicates with the vacuum chamber, itself connected to a vacuum source such as the intake manifold of the internal combustion engine of the vehicle. When the driver presses on the brake pedal, the control rod is moved toward the booster and actuates the three-way valve, the shutter of which closes off communication between the two chambers and opens a passage for supplying atmospheric air to the working chamber. Under the effect of the pressure difference which increases progressively between the two chambers, the piston of the booster moves the push rod toward the master cylinder in order to take up the mechanical play in the braking circuit during an initial braking phase known as the jump phase, and then, with the driver continuing to press on the brake pedal, the pressure increases progressively in the working chamber of the booster and the output pressure of the master cylinder increases linearly as a function of the force applied to the control rod until reaching a saturation phase at which the boost supplied by the booster is at a maximum and does not increase any further, the pressure in the working chamber being equal to atmospheric pressure.

SUMMARY OF THE INVENTION

In this operation, the master cylinder output pressure is determined both by the boost supplied by the booster and by the value of this pressure at the end of the jump phase, for a given force on the control rod.

The object of the invention is particularly to increase, during an emergency braking operation, the master cylinder output pressure at the end of the jump phase and to achieve this in a simple and economical manner by using a minimum number of additional parts and without significantly increasing the overall size.

To this end, it provides a pneumatic brake booster of the aforementioned type, comprising a piston mounted between a control rod and a push rod, the control rod being terminated by a plunger guided translationally in a housing of the piston, and a three-way valve mounted in the piston around the control rod and comprising a shutter engaging with a seat of the piston and with a seat of the plunger in order to selectively supply atmospheric air to the booster, characterized in that it also comprises a cylindrical sleeve mounted in an axially sliding manner in said housing around the plunger, and means which permanently urge the sleeve elastically toward the shutter of the three-way valve in order to move this shutter away from its seat on the plunger and thus to increase the supply of atmospheric air to a working chamber of the booster, this booster also comprising means for axially locking the sleeve when the shutter is in a moved-away position, and means for unlocking the sleeve which are sensitive to the speed of movement of the control rod and of the plunger in the direction of braking and which unlock the sleeve when this speed is at least equal to or greater than a predetermined value.

In the booster according to the invention, the movement of the sleeve, initiated by a rapid movement of the control rod, that is to say during an emergency braking operation, makes it possible to extend the jump phase and therefore increase the value of the master cylinder output pressure at the end of the jump phase and also during the remainder of the braking operation, until achieving saturation of the booster. Thus, the master cylinder output pressure during an emergency braking operation is greater, in the case of an identical force on the control rod, than the master cylinder output pressure during a normal braking operation. The braking efficiency is correspondingly increased as a result.

According to another feature of the invention, the means for axially locking the sleeve are arranged in said housing between the plunger and the piston and comprise an elastically deformable element for retaining the sleeve, this element being mounted in an annular groove in the housing formed in the piston.

A part of the retaining element extends in the direction of the plunger and bears on a ramp or oblique surface part of the plunger so that it can be moved away from the plunger and release the sleeve when the plunger is moved axially toward the push rod with respect to the piston.

In a preferred embodiment of the invention, the retaining element is formed by a spring steel wire stirrup which comprises at least one kink housed in said groove in the housing and at least one kink housed in a notch in the sleeve.

These means are simple, inexpensive and compact.

The booster according to the invention also comprises means borne by the piston and limiting the axial movement of the sleeve toward the shutter, these means also forming means for limiting the axial movement of the plunger with respect to the piston and additionally enabling the sleeve to be returned to an initial position with respect to the piston following an initiation during an emergency braking operation.

In a particularly advantageous manner, these movement-limiting means are formed by a rod or by a clip engaged in openings in the cylindrical walls of the piston and of the sleeve, these openings allowing a limited axial movement of the rod or the clip with respect to the piston.

A better understanding of the invention will be gained and other features, details and advantages thereof will become more clearly apparent from reading the description below, given by way of example and with reference to the appended drawings.

DETAILED DESCRIPTION OF THE INVENTION

By way of convention, in the description below, what is on the left in the drawings will be described as being at the front and what is on the right will be described as being at the rear.

Figure 1:
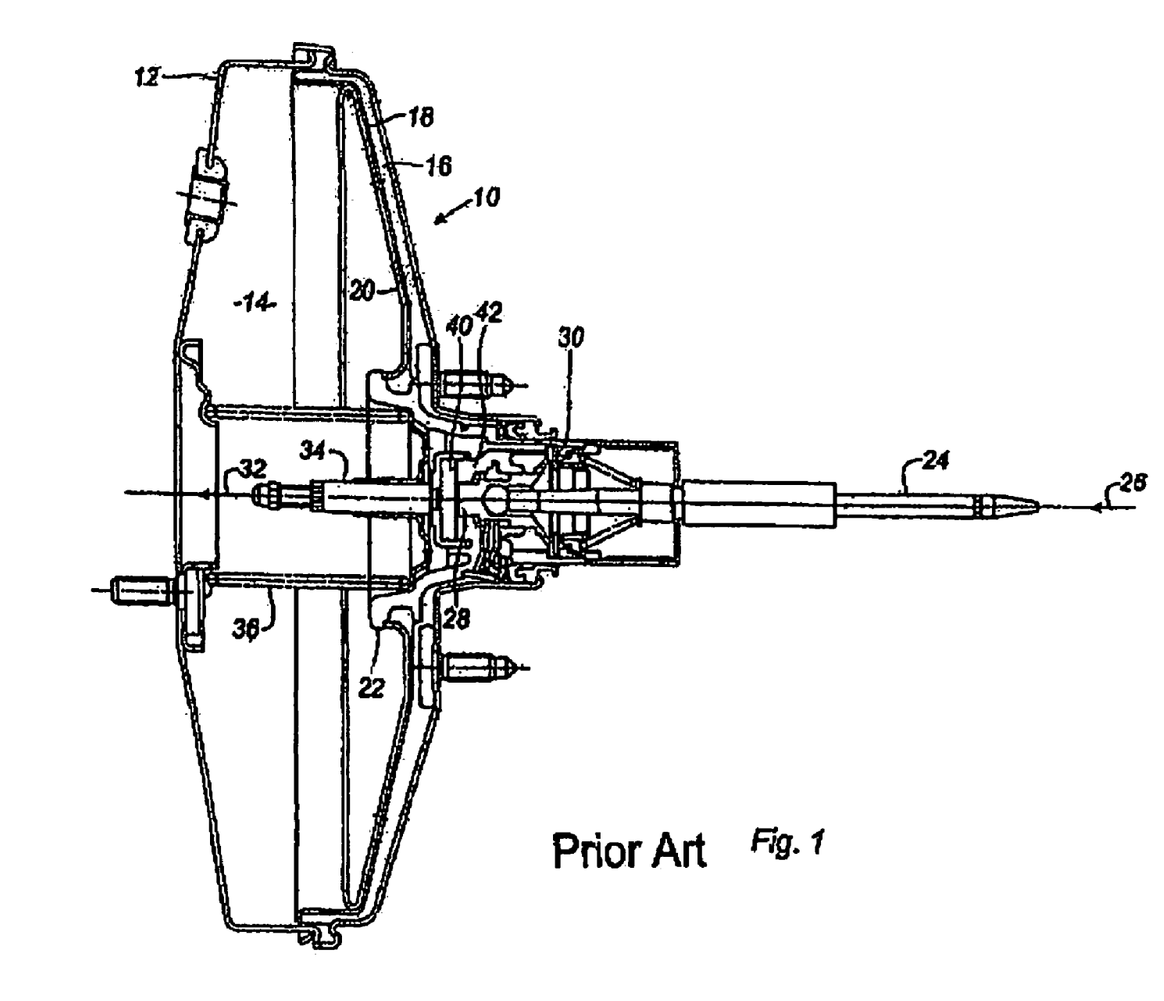
FIG. 1 is a schematic view in axial section of a pneumatic booster of a known type.

FIG. 1 schematically represents a pneumatic brake booster 10 of a known type, comprising a casing 12 delimiting a front chamber 14 and a rear chamber 16 which are separated from one another by a sealed diaphragm 18 borne by a rigid skirt 20. This skirt has a central orifice in which is fastened a piston 22 which can move axially in the booster 10.

A control rod 24 actuated by a brake pedal (not shown) in the direction indicated by the arrow. 26 extends axially at the rear end of the booster and, at its front end, carries a distributor plunger 28 which, at its rear end, cooperates with an annular shutter of a three-way valve 30 mounted in the rear tubular end of the piston 22 around the control rod 24 in order to selectively supply atmospheric air to the rear chamber 16 or working chamber of the booster 10, as a function of the force applied to the control rod 24 by the brake pedal.

The piston 22 of the booster is intended to drive a push rod 34 in axial translation in the direction indicated by the arrow 32, this push rod extending between the piston 22 and a primary piston of a tandem master cylinder (not shown) connected to the front part of the booster 10 and enabling a braking circuit to be supplied with brake fluid under pressure.

A compression spring 36 is mounted inside the booster in the front chamber 14 or vacuum chamber around the push rod 34 and enables the piston 22 to be returned to a rear position or rest position represented in FIG. 1.

At its rear end, the push rod 34 carries a cup 38 which is directed rearward and in which is housed a reaction disk 40 made of substantially incompressible material, in particular rubber or elastomer, against which a part 42 of the booster piston 22 is applied. The front part of the plunger distributor 28 is guided translationally in an axial passage 44 in this part 42 of the piston 22 and is situated in the immediate vicinity of the reaction disk 40, in the rest position.

During a braking operation, the front end of the distributor plunger 28 is in contact with the reaction disk 40 so as to transmit to the control rod 24 and to the brake pedal the reaction force which is generated in the braking circuit and which is transmitted to the reaction disk 40 by the primary piston of the master cylinder and by the push rod 34.

This return of force is felt by the driver and allows him to modulate the force which he applies to the control rod 24 via the brake pedal depending on the braking operation to be performed.

Figure 5:
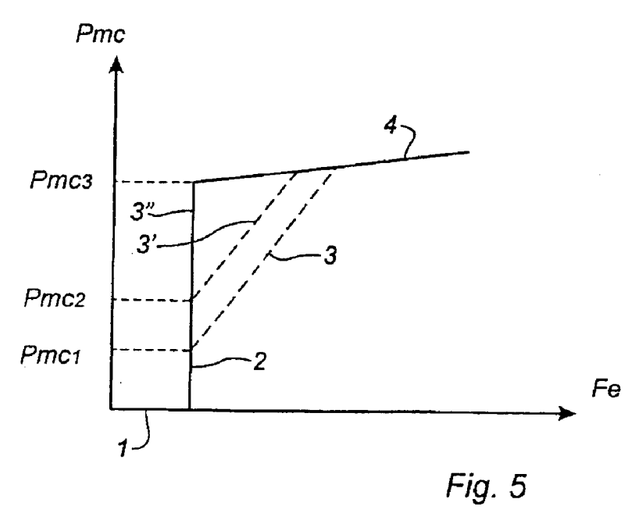
FIG. 5 is a graph representing the variations of the output pressure of a master cylinder associated with a booster according to the invention, as a function of the input force applied to the booster control rod.

As has been represented schematically in FIG. 5, the variation of the master cylinder output pressure Pmc as a function of the input force Fe applied to the control rod 24 for the braking operation comprises a first phase 1 which is a dead travel, a second phase 2 called jump phase, a third, brake-boosting phase 3, and a final phase 4 or saturation phase.

The second phase 2 corresponds to the start of the working chamber 16 of the booster being supplied with atmospheric air. More specifically, when the control rod 24 starts to be moved toward the front with respect to the piston 22 of the booster 10, the shutter of the three-way valve 30 first of all closes off communication between the two chambers 14 and 16 of the booster, then opens a passage for supplying atmospheric air to the chamber 16. The pressure difference which is then established between the chambers 14 and 16 of the booster causes the piston 22 to be moved toward the front and the dead travels in the braking circuit to be taken up, with an increase in the pressure of the brake fluid leaving the master cylinder until a value Pmc1 is reached at the end of the jump phase or phase 2. Next, if the input force Fe applied to the control rod 24 continues to increase, further air at atmospheric pressure is admitted to the working chamber 16 of the booster, during phase 3, until the pressure in this chamber 16 becomes equal to atmospheric pressure. The booster 10 is then in saturation. If the input force Fe increases further, the master cylinder output pressure continues to increase, but much more slightly (phase 4).

It is known in the prior art that, if the jump phase or phase 2 is extended, for example to the pressure Pmc2 indicated in FIG. 5, the curve of the pressure Pmc during the subsequent phase 3' or boost phase is substantially parallel to the curve during the boost phase 3 described above. This makes it possible to achieve an overall increase in the brake boosting, the master cylinder output pressure obtained on the curve 3' being greater than that obtained on the curve 3 for the same input force Fe.

The present invention makes provision to extend the jump phase during an emergency braking operation, by means of the device represented in FIGS. 2 to 4 to which reference will now be made.

In these figures, the same reference numbers have been used to denote the same elements as in FIG. 1.

According to the invention, a cylindrical sleeve 46 is mounted in an axially sliding manner in a housing 48 formed in the part 42 of the booster piston around the distributor plunger 28 mounted at the end of the control rod 24, the rear cylindrical part of the sleeve 46 bearing a seal 50 applied to the internal cylindrical surface of the housing 48.

A compression spring 52 is mounted in the housing 48 between the front end of the latter and the sleeve 46 so as to urge this sleeve permanently toward the rear and apply its rear end 54 in a sealed manner against the annular shutter 56 of the three-way valve 30.

Figure 2:
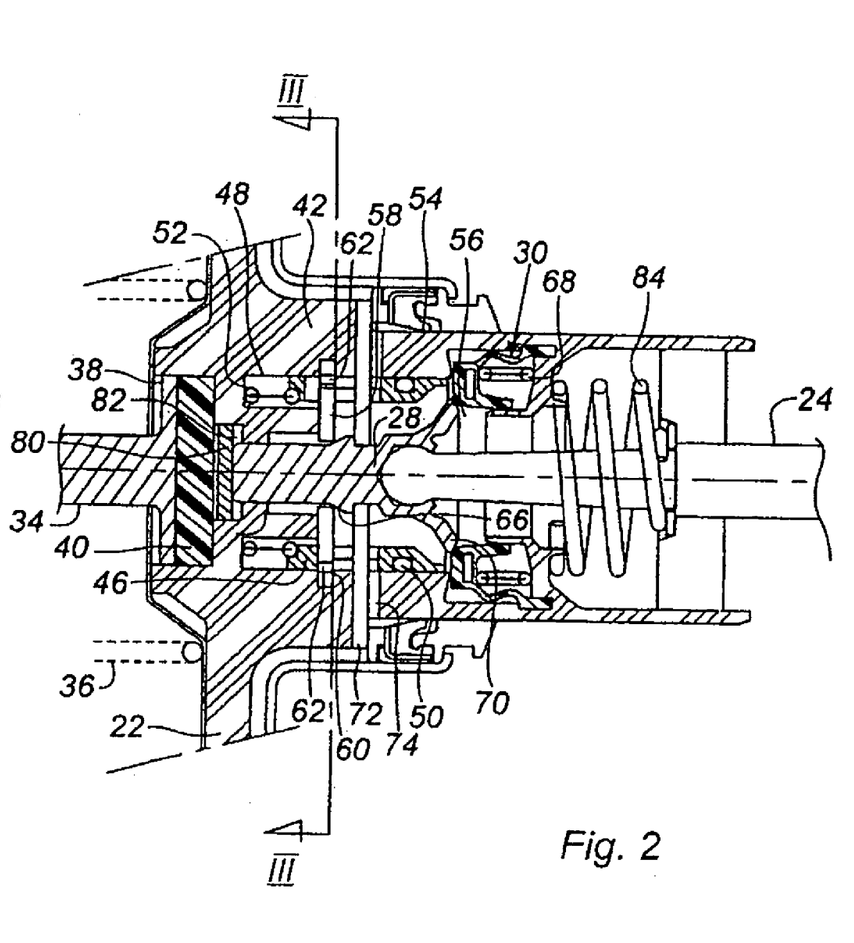
FIG. 2 is a partial view, on a larger scale, of a booster according to the invention.

Means for locking the sleeve 46 in a rest position represented in FIG. 2 are provided between this sleeve on the one hand and the part 42 of the piston and the distributor plunger 28 on the other hand, these locking means being formed by a spring stirrup 58, for example made of steel wire or plastic, which is arranged transversely and which is partly housed in an annular groove or slot 60 in the part 42 of the booster piston so that it can be immobilized axially in this piston.

This stirrup comprises at least two kinks or two branches 62 which are at least partly engaged in an annular groove or in a slot in the sleeve 46 in order to immobilize the latter in axial translation with respect to the booster piston, and at least two kinks or two branches 64 which extend on either side of the distributor plunger 28 and which are intended to cooperate with a frustoconical surface 66 thereof so that they can be moved away from one another and release the sleeve 46 when the distributor plunger 28 is moved toward the front with respect to the booster piston 22.

More specifically, the frustoconical surface 66 of the distributor plunger 28 progressively widens toward the rear and its movement toward the front between the branches or the kinks 64 of the stirrup 58 has the effect of moving these two branches or these two kinks away from one another and of pushing away the aforementioned kinks or branches 62 radially outward out of the annular slot in the sleeve 46 in which they were engaged. Under the action of the spring 52, the sleeve 46 is then moved toward the rear in a sealed manner in the housing 48 of the piston 22 and its rear rim 54 is applied with sealing against the annular shutter 56 of the three-way valve 30 and pushes this valve away toward the rear, against the action of the return spring 68 for this shutter.

Under these conditions, the annular shutter 56 no longer rests on the rear face of the part 42 of the piston, but communication remains closed off between the chambers 14 and 16 of the booster because the sleeve 46 rests on the annular shutter 56. The rear edge 70 of the distributor plunger 28 is moved further away from the annular shutter 56, which has been pushed away toward the rear by the sleeve 46, thereby opening up greater communication between the working chamber 16 of the booster and the external atmosphere.

The distributor plunger 28 is held in an initial rest position by a rod or a transverse clip 72 which is housed in two openings 74 of short axial length in the part 42 of the piston and which extends through an annular slot 76 in the sleeve 46. This rod or this clip 72 cooperates with the distributor plunger 28 so as to limit its movement toward the rear, the rear end of the frustoconical surface 66 of the distributor plunger butting against the branches of the clip 72 as represented in FIG. 2.

Figure 4A:
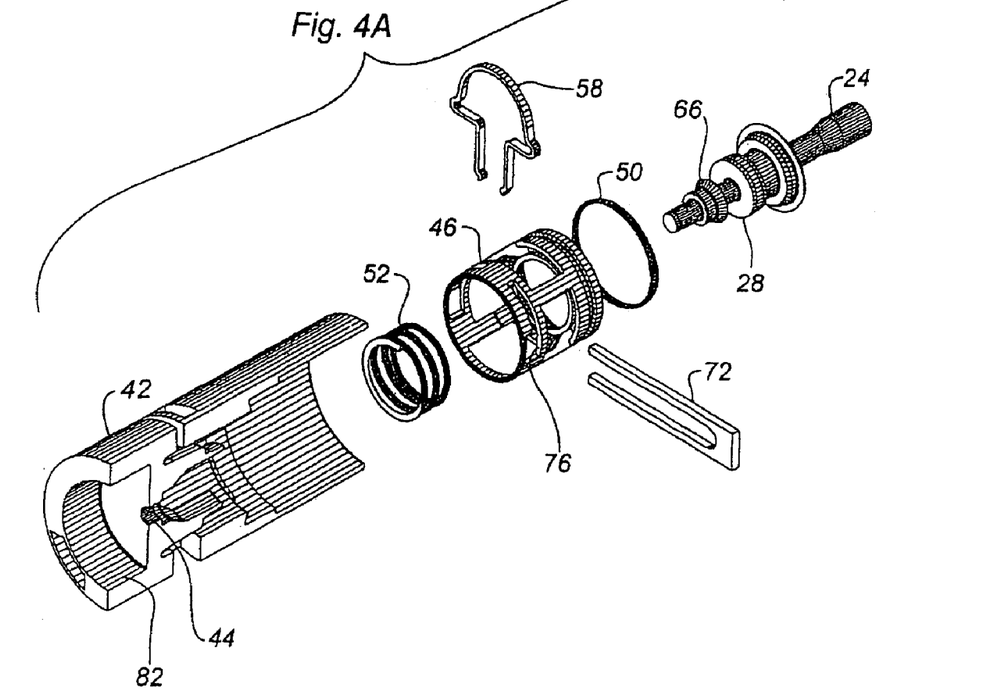
FIG. 4A is an exploded perspective schematic view of part of the booster according to the invention.
Figure 4B:
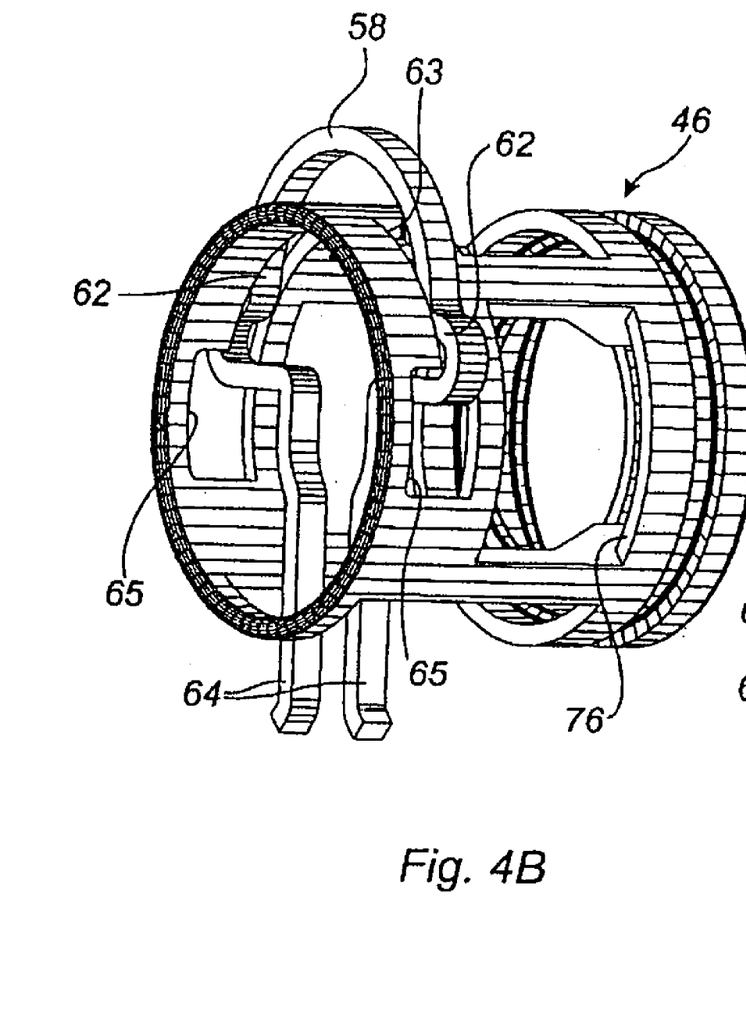
FIGS. 4B and 4C are partial perspective schematic views on a larger scale.
Figure 4C:
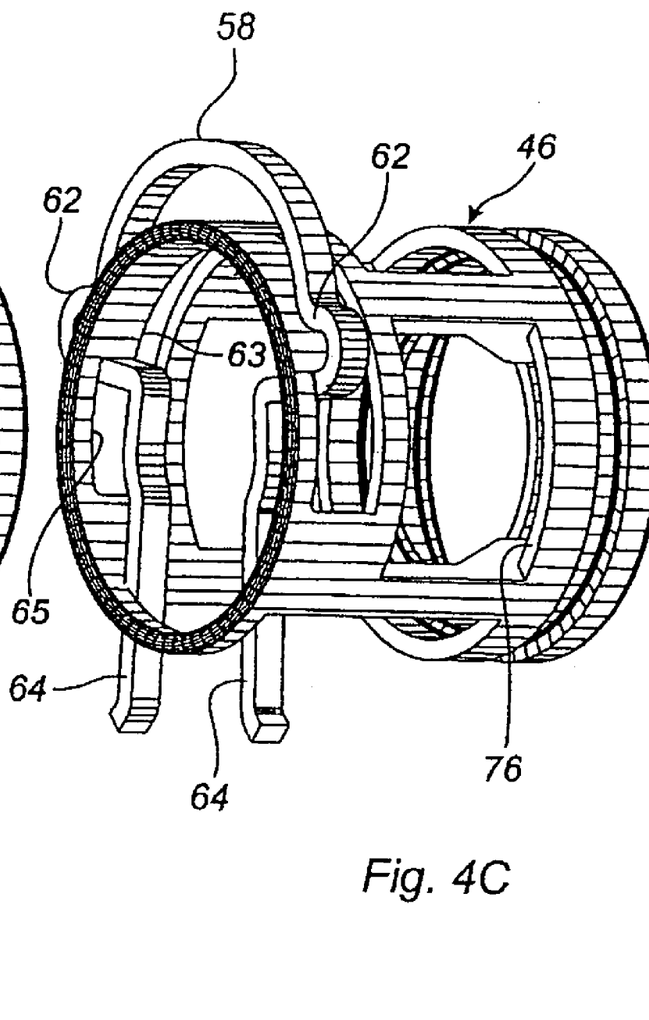

The structures of the sleeve 46, of the spring stirrup 58 and of the clip 72 are represented more clearly in FIGS. 4A and 4B and 4C, in which figures the stirrup 58 has a slightly different form from that represented in FIG. 2, but performs the same function and produces the same results.

In FIG. 4B, in which the position represented corresponds to that of FIG. 2, the stirrup 58 is in a state in which it locks the sleeve 46 in a front position, and its kinks 62 rest axially on a front edge of an annular slot 63 in the sleeve 46. The branches 64 of the stirrup are relatively close to one another and extend on either side of the front cylindrical end of the distributor plunger 28.

In FIG. 4C, the branches 64 of the stirrup have been moved away by the frustoconical part 66 of the plunger distributor 28, the kinks 62 have been moved away and have escaped from the front edge of the slot 63, the sleeve 46 has been moved axially toward the rear by its return spring, and the branches 64 of the stirrup form a stop limiting the rearward movement of the sleeve 46, the slot 63 in the latter comprising axial offsets 65 intended to engage on the branches 64. The clip 72, which defines the rest position for the distributor plunger 28 and which is engaged in an annular slot 76 in the sleeve 46, butts against the front edge of the slot 76 so as to return the sleeve 46 to the front position in which it is retained by the stirrup 58, at the end of a braking phase.

The front end of the distributor plunger 28 is guided in axial translation in the central orifice 44 of the front-end transverse wall of the housing 48, this central orifice opening out in the vicinity of the reaction disk 40 arranged between the front part of the piston 22 and the push rod 34.

In the exemplary embodiment represented in FIG. 2, a washer 80 is interposed between the reaction disk 40 and the front end of the distributor plunger 28 and is able to move axially, over a limited travel, in a recess 82 in the front-end face of the piston 22, this recess having a diameter which is greater than the diameter of the front end of the distributor plunger 28.

The device which has just been described operates in the following way:

In a rest position corresponding to a non-braking condition, the sleeve 46 is in the position represented in FIG. 2 with respect to the part 42 of the piston 22, and its rear rim 54 is moved away from the annular shutter 56 of the three-way valve 30. In this position, the sleeve 46 is locked on the piston 22 by the spring stirrup 58.

The annular shutter 56 rests on the rear end 70 of the distributor plunger 28 and closes off communication between the working chamber 16 of the booster and the external atmosphere. The annular shutter 56 is moved away from the rear end of the part 42 of the piston, thereby allowing communication, in a manner which is well known, between the vacuum chamber 14 and the working chamber 16 of the booster.

When the driver of the vehicle presses on the brake pedal, the control rod 24 is moved toward the front, which has the effect of applying the annular shutter 56 against the rear end of the part 42 of the piston 22 and of isolating the chambers 14 and 20 from one another, and then of moving the rear end 70 of the distributor plunger away from the annular shutter 56, and allows air at atmospheric pressure to enter the working chamber 16 of the booster.

Under the effect of the pressure difference which is established between the two chambers 14 and 16 of the booster, the booster piston 22 is moved toward the front and its movement is transmitted by the push rod 34 to the primary piston of the master cylinder so as to increase the pressure of the brake fluid in the vehicle braking circuit.

A condition of equilibrium is found when the annular shutter 56 of the three-way valve 30 rests once more on the rear end of the distributor plunger 28, as represented in FIG. 2. The reaction disk 40 is compressed on the piston 22 by the push rod 34 and is applied, by way of the washer 80 in the exemplary embodiment shown in FIG. 2, against the front end of the distributor plunger 28, which transmits the reaction of the braking circuit to the control rod 24 and to the brake pedal. This reaction is felt by the driver, who can thus modulate the force which he is applying to the brake pedal depending on the braking operation to be performed.

During normal braking, the speed of forward movement of the control rod 24 is such that the distributor plunger 28 is not moved forward more quickly than the booster piston 22. The sleeve 46 then remains immobilized in terms of axial movement in the piston 22 by the stirrup 58 and plays no function in the braking operation.

By contrast, during emergency braking, the control rod 24 moves the distributor plunger forward more quickly than the piston 22 is itself moved forward by the rise in pressure in the working chamber 16, and the frustoconical surface 66 of the distributor plunger 28 moves the branches 64 of the stirrup 58 away from one another. However, the sleeve 46 remains locked on the part 42 of the piston 22 by the clip 72 until the piston has itself covered a certain forward distance, thereby enabling the clip 72 to butt against the rear end of the openings 74.

The sleeve 46, which has been released by the spring stirrup 58, is pushed away toward the rear by the spring 52, and its rear rim 54 is applied with sealing against the annular shutter 56 of the three-way valve and pushes this shutter away toward the rear. This increases the gap between the rear end 70 of the distributor plunger 28 and the annular shutter 56 and therefore increases the opening of the passage providing communication between the working chamber 16 of the booster and the surrounding atmosphere, and the distributor plunger 28 has to retreat in order to return to an equilibrium position in which it rests on the annular shutter 56. If the driver then presses once more on the brake pedal to perform an emergency braking operation, the distributor plunger 28 must travel a greater forward distance with respect to the piston 22 before its front end is applied against the reaction disk 40, which corresponds to the end of the jump phase.

This phase is therefore extended, as represented in FIG. 5, the master cylinder output pressure then having the value Pmc2.

During this emergency braking, the driver continues to apply a force to the brake pedal, and the master cylinder output pressure follows the curve 3' of FIG. 5 until reaching the saturation phase or phase 4.

This extension of the jump phase makes it possible to modulate the boost supplied by the booster 10 as a function of the speed of movement of the control rod 24, and therefore of the emergency nature of the braking.

The rearward movement of the sleeve 46 by the spring 52, in the housing 48 of the booster piston, is limited by butting against the branches 64 of the stirrup 58, this stirrup itself being held in an annular channel 60 in the part 42 of the piston.

When the driver stops pressing on the brake pedal, the control rod 24 and the distributor plunger 28 are moved rearward by the return spring. 84 for the control rod 24, and the rear end 70 of the distributor plunger is applied to the annular shutter 56 of the three-way valve and closes the passage for admitting air at atmospheric pressure to the working chamber 16 of the booster, also pushing this shutter away toward the rear, which has the effect of reestablishing communication between the vacuum chamber 14 and the working chamber 16 of the booster.

The booster piston 22 is moved rearward by its return spring 36 and returns to its butting position against the booster cover. The clip 72 is then moved forward again in the openings 74 in the part 42 of the piston 22, by butting against the booster cover, and returns to the position represented in FIG. 2. In this position, the clip 72 defines a rest position for the distributor plunger 28, the rear face of its frustoconical part 66 resting on the clip 72. As a result of its forward movement in the openings 74 in the part 42 of the piston, the clip 72 has also returned the sleeve 46 toward the front, this sleeve readopting the front position represented in FIG. 2, in which it is again locked by the arms or the kinks 62 of the stirrup 58.

The flat washer 80 interposed with clearance between the front end of the distributor plunger 28 and the reaction disk 40 has the following function: when the driver releases the brake pedal after a braking operation, the washer 80 is pushed toward the rear by the reaction disk 40 and is applied against the bottom of the recess 82 formed in the front face of the piston 22. In this position, the reaction of the braking circuit is no longer transmitted to the distributor plunger 28 and to the control rod 24 but to the piston 22. If the driver then has to brake once more, the forward movement of the control rod 24 and of the distributor plunger 28 is not impeded by the reaction force of the braking circuit, at least for as long as the front end of the distributor plunger 28 has not reapplied the washer 80 against the reaction disk 40, thereby facilitating this complementary braking.

In this case, the jump phase 2 is increased until the saturation phase and finishes at Pmc3, as represented by the solid line at 3' in FIG. 5.

In the booster according to the invention, the parts which make it possible to extend the jump phase in the event of emergency braking and to modulate brake boosting by the booster are simple and economical parts which are not subjected to high loads. To give a clearer idea, it may be stated, purely by way of example, that the maximum travel of the sleeve 46 is about 1 to 2 mm and that the speed of forward movement of the control rod 24 must be at least 100 mm per second in order to initiate unlocking of the sleeve 46 by the stirrup 58.

Figure 3:
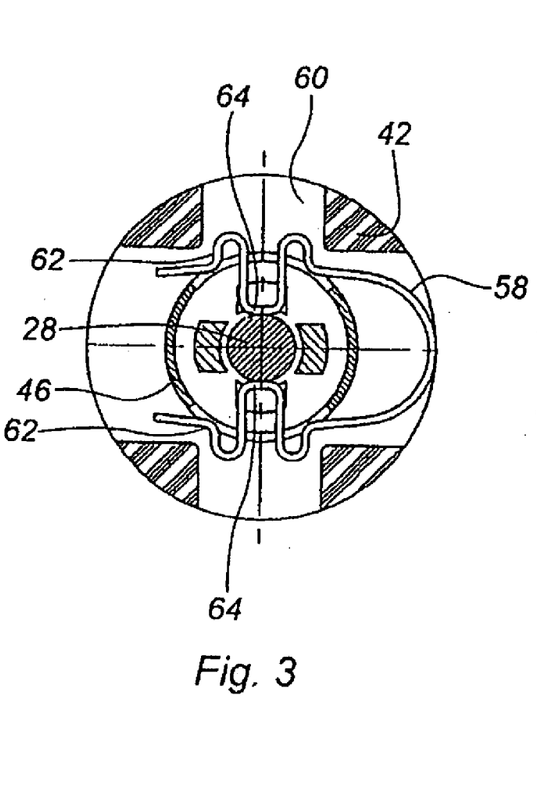
FIG. 3 is a partial view in section taken along line III—III of FIG. 2.
Figure 6:
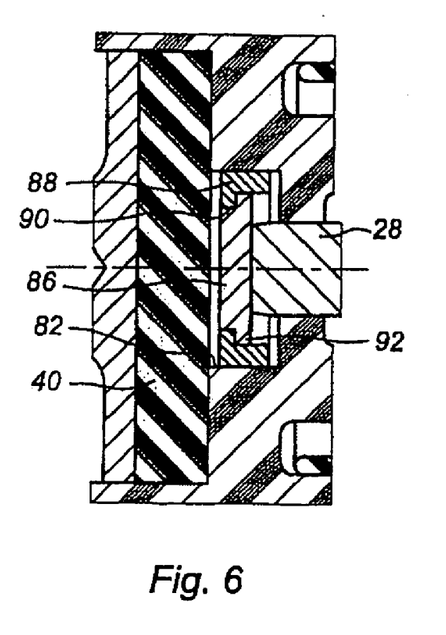
FIG. 6 is a partial schematic view in section of a variant embodiment.
Figure 8:
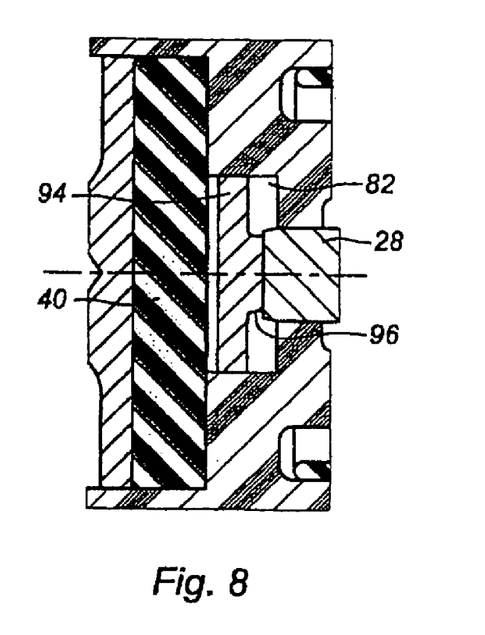
FIGS. 8 and 9 are views corresponding to FIGS. 6 and 7, for another variant embodiment.

The variant embodiments of FIGS. 6 and 8 differ from the embodiment of FIGS. 2 to 4 by the type of washer interposed between the reaction disk 40 and the front end of the distributor plunger 28.

In FIG. 6, the front end of the distributor plunger 28 rests on a washer 86 having a diameter which is less than that of the recess 82, this washer being guided in axial translation in a ring 88, itself guided in axial translation in the recess 82 and having an axial length which is greater than that of the washer 86. The front end of the ring has a radial rim 90 for retaining the washer 86, the rear end of which is formed with a radial rim 92 cooperating with the rim 90 of the ring 88. The axial clearance of the ring 88 in the recess 82 is less than the possible retreating movement of the sleeve 46 in the housing 48.

Figure 7:
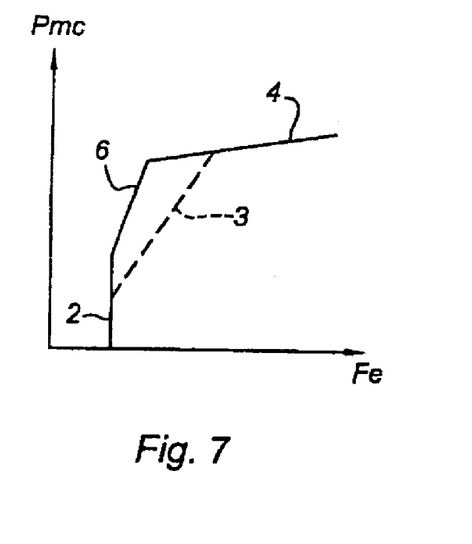
FIG. 7 is a graph, similar to the one of FIG. 5, for the variant embodiment of FIG. 6.

During operation in an emergency braking situation, and as represented by the curve 6 in FIG. 7, the arrangement of FIG. 6 makes it possible to extend the jump phase and modify the boost ratio, this modification being determined by the diameter of the washer 86.

In FIG. 8, the washer 94 is guided in translation in the recess 82, like the washer 80 of the first embodiment described, but its rear face has an axial cylindrical tail 96 which rests on the front end of the distributor plunger 28 and which has a diameter less than that of the axial passage 44 of the part 42 of the piston in which the front end of the distributor plunger 28 is guided.

Figure 9:
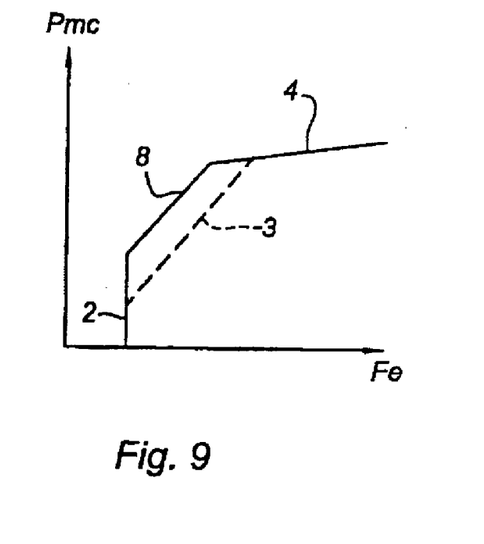
Figure 10:
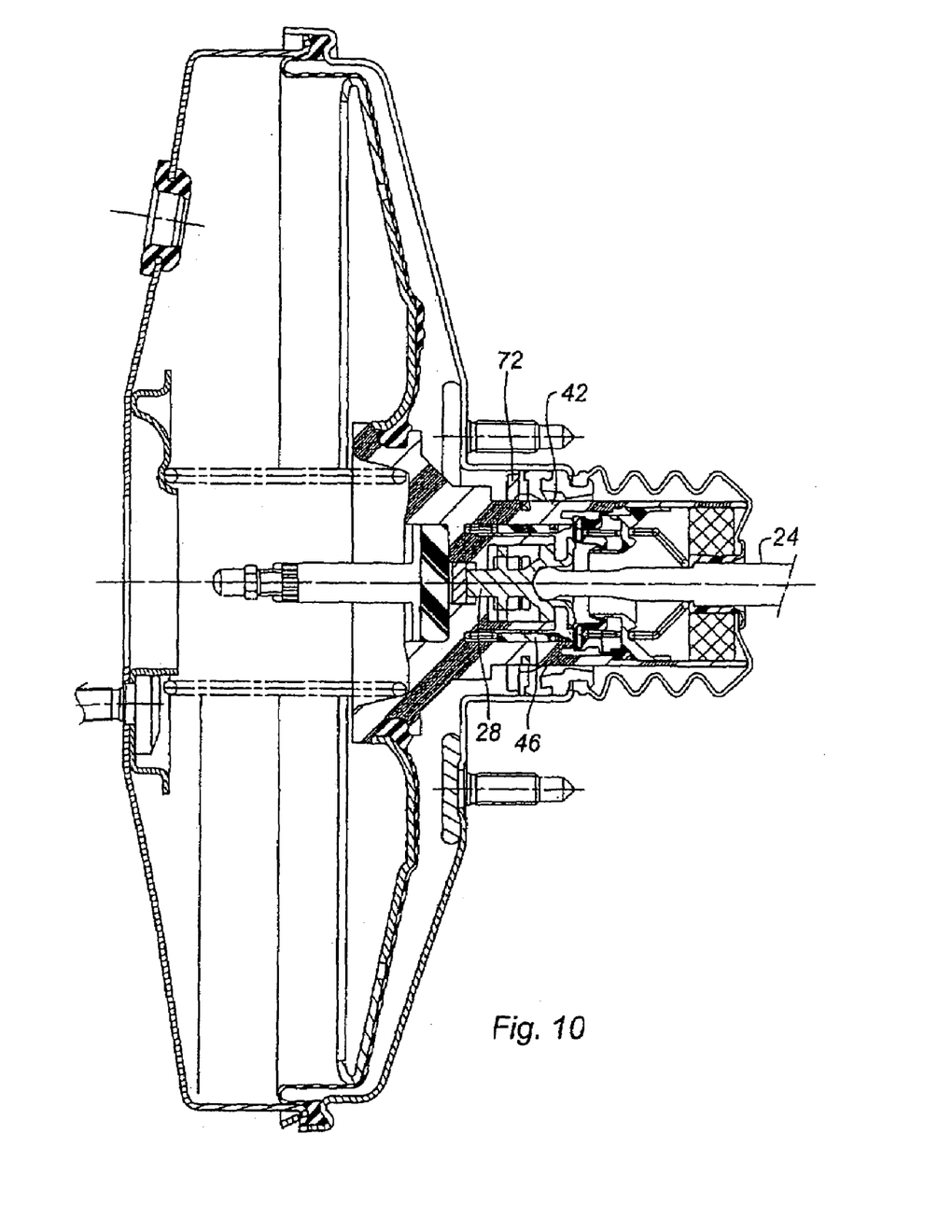
FIG. 10 is a schematic view in axial section of another variant embodiment.
Figure 11:
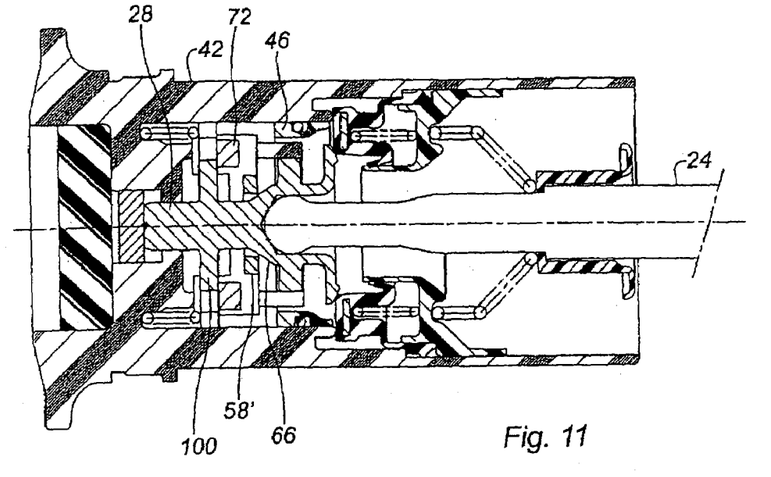
FIGS. 11 and 12 are enlarged partial views in axial section and FIG. 13 is an enlarged partial view in cross section of the variant of FIG. 10.
Figure 12:
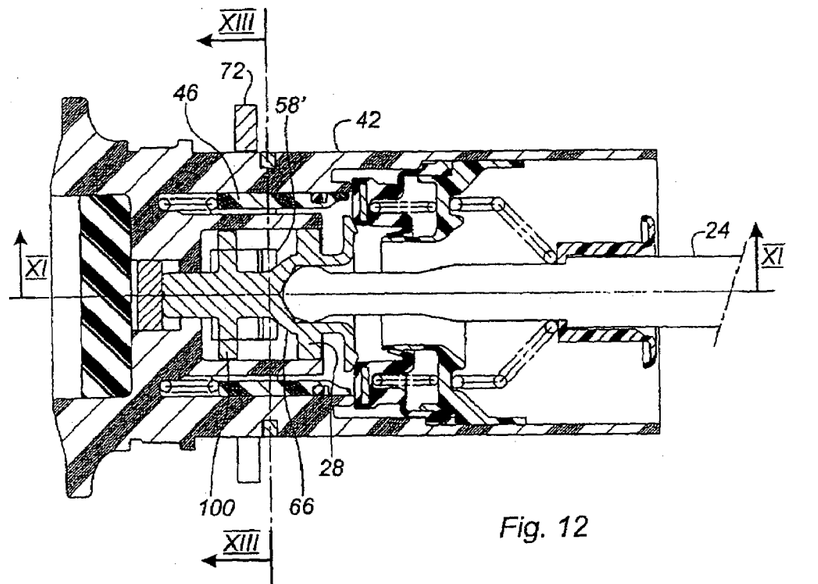
Figure 13:
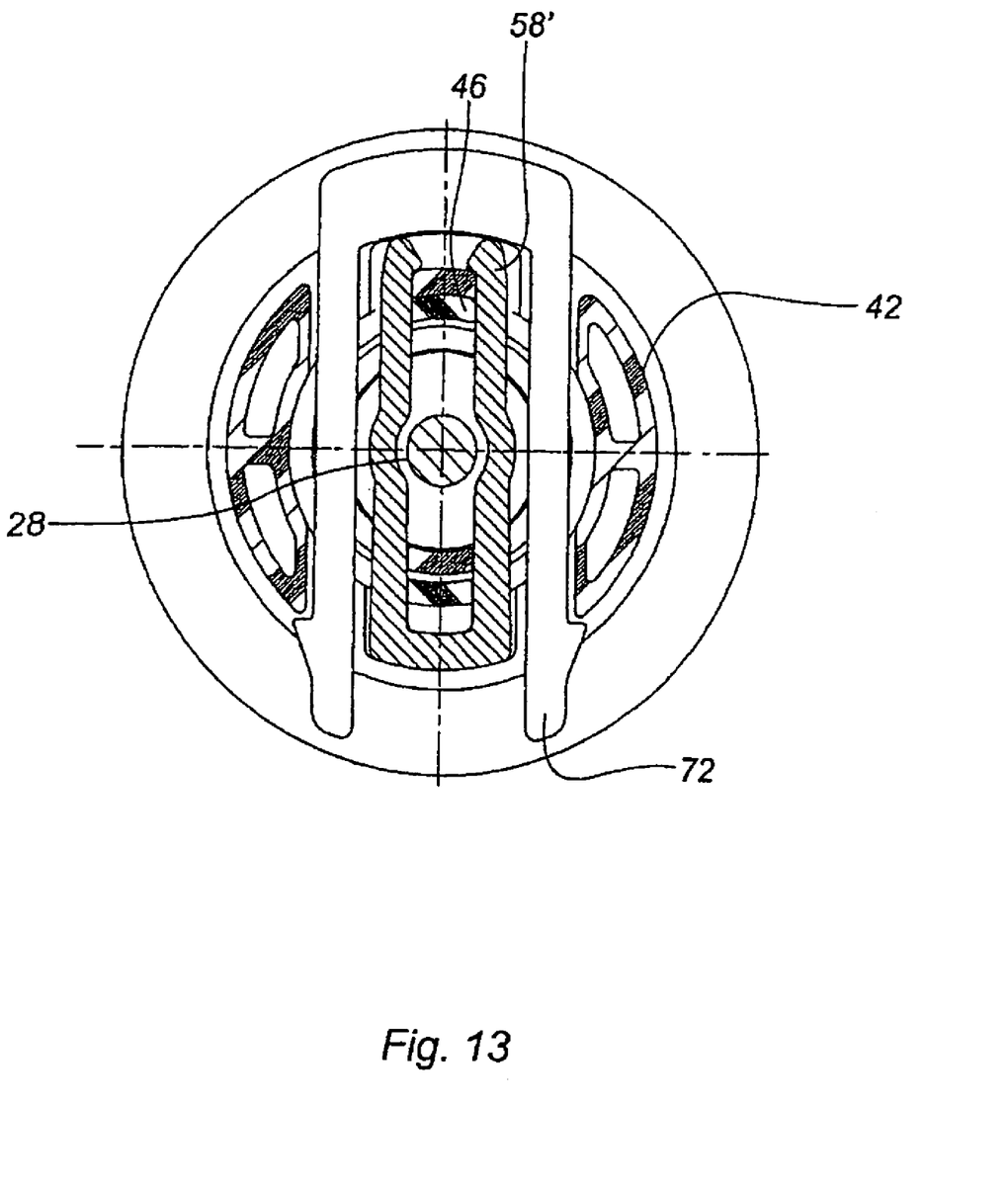

With this arrangement, the distributor plunger butts against the tail 96 of the washer 94 during an emergency braking operation and this tail 96 remains in a resting position against the distributor plunger 28 during the retreating movement thereof subsequent to the retreating movement of the sleeve 46. A reaction on the distributor plunger is therefore retained and the boost ratio is not modified during emergency braking with an increase in the jump, as represented in FIG. 9 by the curve 8.

In the variant embodiment of FIGS. 10 to 13, the clip 72 is substantially in the same transverse plane as the spring stirrup 58' which keeps the sleeve 46 in the front position. This makes it possible to reduce the length of the piston body 42, of the sleeve 46 and of the distributor plunger 28, and therefore to reduce the overall axial size.

In this variant, the clip 72 and the stirrup 58' have a U shape and are mounted by transverse translation in transverse slots in the piston body 42 and in the sleeve 46 (FIG. 13) and by elastic snap-fastening on the piston body 42. The distributor plunger 28 has an annular collar 100 designed to bear on the clip 72 in the rest position.

As for the remainder, the means of this variant embodiment are the same as those already described with reference to the preceding figures, and its operation is identical to that described.

The invention claimed is:

1. A pneumatic brake booster for a motor vehicle, comprising a piston (22) mounted between a control rod 20 (24) and a push rod (34), the control rod being terminated by a distributor plunger (28) guided translationally in a housing (48) of the piston, and a three-way valve (30) mounted in the piston (22) around the control, rod (24) and comprising a shutter (56) engaging with a seat of the piston (22) and with a seat (70) of the distributor plunger (28), a cylindrical sleeve (46) mounted in an axially sliding manner in said housing (48) around the distributor plunger (28), and means (52) which permanently urge the sleeve (46) elastically toward the shutter (56) of the three-way valve in order to move said shutter away, from the seat (70) on the distributor plunger (28) and to increase the supply of atmospheric air to a working, chamber (16) of the booster means (58, 58') for axially locking the sleeve (46) when the shutter (56) is in a moved-away position, and means (66) for unlocking the sleeve which are sensitive to the speed of movement of the control rod (24) and of the distributor plunger (28) in the direction of braking and which unlock the sleeve (46) when this speed is at least equal to a predetermined value, characterized in that the means for axially locking the sleeve (46) are arranged in the housing (48) of the piston between the distributor plunger (28) and the piston (22) and comprise an elastically deformable element (58, 58') for retaining the sleeve (46), said deformable element (58, 58') being mounted in an annular groove or slot in the body (42) of the piston (22), said deformable element (58, 58') bears on a ramp or oblique surface (66) of the distributor plunger (28) so that it can be moved away from said plunger and release the sleeve (46) when the distributor plunger (28) is moved axially toward the push rod (34) with respect to the piston (22), said deformable element (58, 58') being formed by a spring steel wire stirrup comprising at least one kink housed in said groove in the housing (48) of the piston and at least one kink (62) housed in a notch or slot in the sleeve (46), said deformable element (58, 58') comprises at least two opposed kinks (62) housed in opposing notches or slots in the sleeve (46).

2. The booster according to claim 1, characterized in that the sleeve (46) is able to slide axially in a sealed manner in the housing (48) of the piston (22).

3. The booster according to claim 2, characterized in that a sleeve end rim (54) intended to be applied against the shutter (56) forms a sealing seat for the shutter.

4. The booster according to claim 3, characterized in that the retaining deformable element (58, 58') limits the axial movement of the sleeve (46) toward the shutter (56) of the three-way valve.

5. The booster according to claim 4, characterized in that it comprises means (72) borne by the piston (22) to limit the axial movement of the distributor plunger (28) with respect to the piston (22) toward the shutter (56) of the three-way valve and to define a rest position for the distributor plunger (28).

6. The booster according to claim 5, characterized in that said movement-limiting means comprise a rod or a clip (72) engaged in openings (74, 76) in the cylindrical walls of the piston (22) and in the sleeve (46) and are able to move axially over a limited travel with respect to the piston (22).

7. The booster according to claim 6, characterized in that said movement-limiting means (72) also form means for returning the sleeve (46) to an axial-locking position in the housing (48) of the piston, in which the sleeve (46) is moved away from the annular shutter (56) of the three-way valve.

8. The booster according to claim 7, characterized in that the means (72) for limiting the movement and for defining a rest position for the distributor plunger (28) are substantially in the same transverse plane as the means (58') for axially locking the sleeve (46).

9. The booster according to claim 8, characterized in that the means (72) for limiting movement and for defining the rest position for the distributor plunger (28) and the means (58') for axially locking the sleeve (46) are mounted by elastic snap-fastening on the body (42) of the piston.

10. The booster according to claim 9, characterized in that a washer (80, 86, 94) is interposed with an axial clearance between the end of the distributor plunger (28) and a reaction disk (40) mounted between the piston (22) and the push rod (34), this washer (80, 86, 94) being housed in a recess (82) in the end of the piston (22) and being applied against the bottom of this recess in order to transmit a reaction force while the distributor plunger (28) is returning to the rest position or non-braking position.

11. The booster according to claim 10, characterized in that the washer (80) is a flat washer and transmits the reaction force to the piston (22).

12. The booster according to claim 10, characterized in that the washer (86) is guided in axial translation in a ring (88) guided in axial translation in the recess (82), the ring having an axial length which is greater than that of the washer, and the washer (86) transmits the reaction force to the distributor plunger (28).

13. The booster according to claim 10, characterized in that the washer (94) comprises an axial cylindrical tail (96) which transmits the reaction force to the distributor plunger (28).

14. A pneumatic brake booster for a motor vehicle, comprising a piston (22) mounted between a control rod (24) and a push rod (34), the control rod being terminated by a distributor plunger (28) guided translationally in a housing (48) of the piston, and a three way valve (30) mounted in the piston (22) around the control rod (24) and comprising a shutter (56) engaging with a seat of the piston (22) and with a seat (70) of the distributor plunger (28), a cylindrical sleeve (46) mounted in an axially sliding manner in said housing (48) around the distributor plunger (28), and means (52 which permanently urge the sleeve (46) elastically toward the shutter (56) of the three-way valve in order to move said shutter away from the seat (70) on the distributor plunger (28) and to increase the supply of atmospheric air to a working chamber (16) of the booster, means (58, 58') for axially locking the sleeve (46) when the shutter (56) is in a moved-away position, and means (66) for unlocking the sleeve which are sensitive to the speed of movement, of the control rod (24) and of the distributor plunger (28) in the direction of braking and which unlock the sleeve (46) when this speed is at least equal to a predetermined value, characterized in that the means for axially locking the sleeve (46) are arranged in the housing (48) of the piston between the distributor plunger (28) and the piston (22) and comprise an elastically deformable element (58, 58') for retaining the sleeve (46), said deformable element (58, 58') being mounted in an annular groove or slot in the body (42) of the piston (22) and being famed by a spring steel wire stirrup comprising at least one kink housed in said groove in the housing (48) of the piston and at least one kink (62) housed in a notch or slot in the sleeve (46) with at least two opposed kinks (62) housed in opposing notches or slots in the sleeve (45).

* * * * *